UNITED STATES PATENT OFFICE.

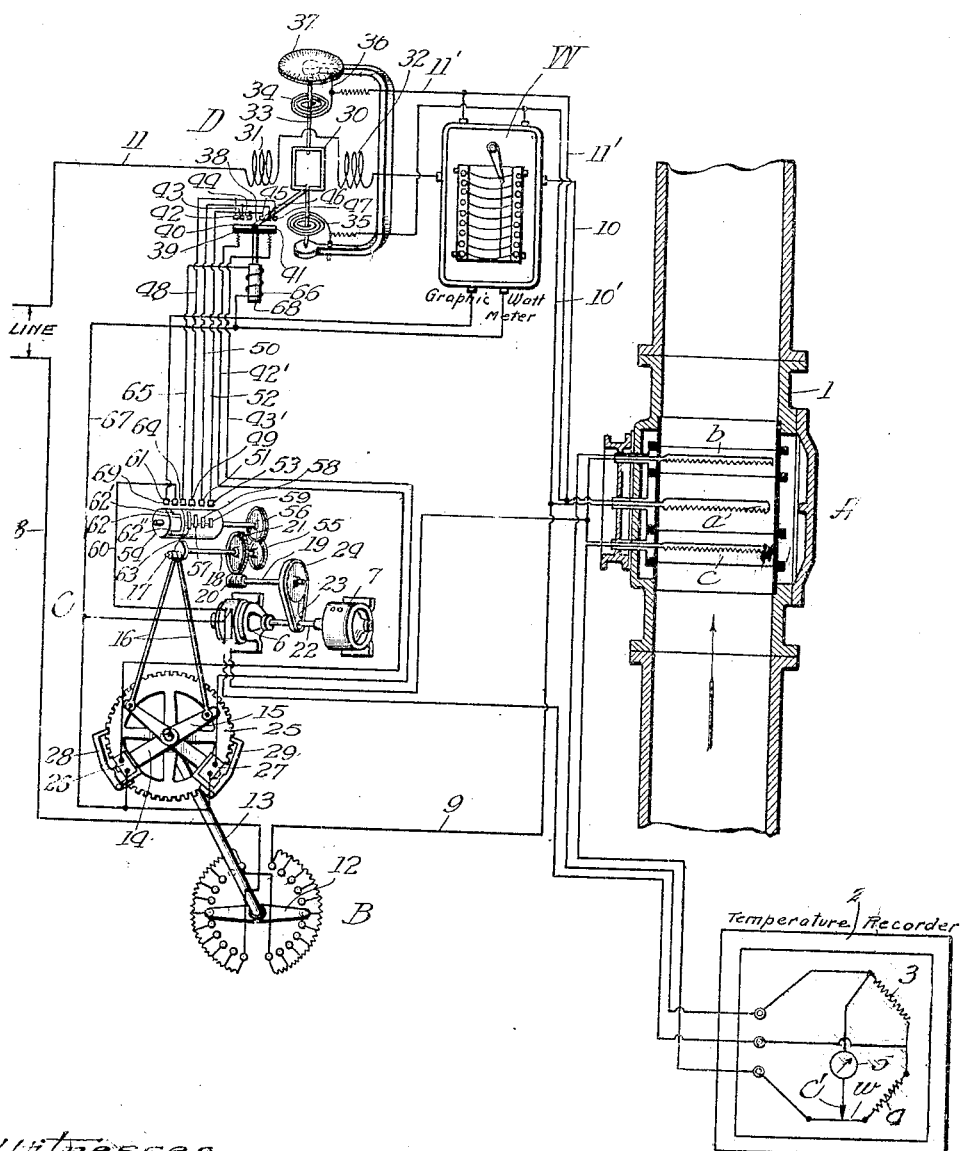

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID-METER.

1,285,868.  Specification of Letters Patent.  Patented Nov. 26, 1918.

Application filed January 25, 1917. Serial No. 144,436.

*To all whom it may concern:*

Be it known that I, JOHN C. WILSON, a citizen of the United States, residing at Milwaukee, in the county of Milwaukee and State of Wisconsin, have invented new and useful Improvements in Fluid-Meters, of which the following is a specification.

This invention relates to fluid meters.

Fluid meters for measuring the rate of flow of fluids have been developed in which heat is imparted to the fluid and the effect of the heat transfer or the fluid is utilized in determining the rate of flow.

In some meters the heat dissipated from the heater is measured and the effect upon the fluid is also measured, while in other types of meters the heat dissipation is controlled either manually or automatically to maintain a constant temperature rise of the fluid. In still other types of meters the heater is caused to dissipate heat at a constant rate and the temperature effect on the fluid is determined.

This invention relates more particularly to the last mentioned type of meters.

It has been proposed to cause the heater to dissipate heat at a constant rate by supplying electric energy to the heater at a constant voltage or by regulating the voltage to maintain it constant. However, in such cases it is presupposed that the heater will remain at a constant resistance so that if the voltage across its terminals is left constant a constant wattage will be dissipated from it. In practice, however, the heater does not remain at a constant resistance for its resistance is affected by corrosion of the heater coil, slight temperature coefficients in the heater terminals, and varying temperatures of the heater coil due to deposits, etc. Furthermore, with a fixed voltage the heater resistance varies with the rate of flow and therefore the heater wattage will vary.

One object of this invention is to provide means for causing the heater to operate at a constant wattage regardless of variations in resistance of the heater.

Another object is to provide means for causing the heater to operate at a constant wattage regardless of variations in the voltage of the main line.

Another object is to provide means for causing the heater to operate at a constant wattage regardless of any variations which would under ordinary conditions tend to affect the wattage of the heater.

Another object is to provide an improved method of measuring the rate of flow of fluids.

An embodiment of the invention is illustrated in the accompanying drawing which is a diagrammatic representation of the various parts.

The apparatus illustrated comprises, in general, a fluid meter A having an electric heater $a$ and electric resistance thermometers $b$ and $c$. A rheostat B serves to vary the wattage of the electric heater $a$ and is actuated by the mechanism denoted generally by the reference character C. The effect of the mechanism C on the rheostat B is controlled electrically by the group of parts shown at D, the operation of which is automatically controlled by the wattage of the circuit in which the electric energy supplied the heater $a$ is connected. It is therefore apparent that any change in the wattage of the heater will operate the parts D to vary the resistance B through the intermediary of the mechanism C. These variations in the resistance B serve to maintain the wattage of the heater constant.

The specific construction of the meter A forms no part of the present invention so it is sufficient for the present purpose to note that it comprises a housing 1 interposed in the length of the conduit 2 through which the fluid to be measured flows. The electric heater $a$ heats the fluid as it passes through the housing 1 and the electric thermometer resistances $b$ and $c$ disposed at opposite sides of the heater $a$ indicate the rise in temperature of the fluid as a result of the heat imparted thereto. The thermometer resistances are electrically connected to a temperature difference recorder 2 which is of well known type and hence is illustrated only diagrammatically. Coils 3 and 4 which are energized respectively by the current through the thermometer resistances $b$ and $c$ control a needle 5. When the needle 5 is deflected either way from its central position it causes a contact $c'$ to move along a slide wire resistance $w$ until the needle again balances. The contact $c'$ carries a pen which records the position of the contact $c'$ along the length of the slide wire $w$. The temperature recorder may be calibrated to record the rate of flow and therefore if the rate of heat dissipation from the heater $a$ is maintained constant the movement of the contact $c'$ will be an indication of the rate of flow of the fluid. The temperature difference recorder may therefore be calibrated to indicate directly the rate of flow of the fluid.

Electric energy is supplied to the thermometer resistances $b$ and $c$ from a generator 6 driven by an electric motor 7. The heater is supplied from an independent source of electric energy.

The electric heater $a$ is connected in series with the main line by means of conductors 8, 9, 10 and 11. Between the conductors 8 and 9 is interposed the variable resistance B which serves to regulate the energy supplied to the heater $a$. This variable resistance may be a rheostat of well known type having an arm 12, the position of which determines the amount of resistance connected in series with the heater. The arm 12 is secured to a rotatable shaft 13 which is automatically actuated by the mechanism C, somewhat similar in construction to the corresponding mechanism shown in the patent to Carl C. Thomas, No. 1,222,492 of April 10, 1917, for varying the energy supplied to the heater. This mechanism comprises a pair of rocker arms 14 and 15 loosely mounted to turn about the axis of shaft 13 and arranged to be oscillated by the connecting rods 16 and a crank 17. The crank 17 is associated with a shaft 18 which is rotated from an intermediate shaft 19 by means of a worm 20 and worm wheel 21 secured to the shafts 19 and 18 respectively. The intermediate shaft 19 is driven from the motor shaft 22 by means of a sprocket chain or belt passing over the pulleys 23 and 24 on the motor shaft and intermediate shaft respectively. It is therefore evident that the motor will serve to rotate the crank 17 and the latter will impart oscillatory motion to the rocker arms 14 and 15 through the intermediary of the connecting rods 16.

Secured to the shaft 13 is a ratchet wheel 25 to which a step-by-step motion is imparted in either direction by the oscillation of the rocker arms 14 and 15. This is accomplished by mounting electromagnets 26 and 27 on the rocker arms 14 and 15 respectively and associating with said magnets pivoted armatures 28 and 29 respectively. These armatures are in the nature of pawls which are normally out of engagement with the teeth of the ratchet wheel 25. It is obvious, however, that energization of either magnet will attract the corresponding pawl and then the ratchet wheel will be turned in one direction or the other by the oscillation of the rocker arm depending upon which magnet is energized. The rocker arms oscillate through a fixed distance and hence the duration of energization of the magnets will determine the distance through which the ratchet wheel 25 is turned and the amount of resistance cut in or out of circuit with the heater.

This selective energization of the magnets 26 and 27 and the duration of the energization are controlled by the instrumentalities diagrammatically shown at D, which, as before stated, are in turn controlled by the wattage of the circuit containing the heater.

The instrumentalities may comprise a torsional wattmeter involving the use of a movable coil 30 connected in parallel with the heater $a$, and the stationary coils 31 and 32 connected in series with the heater. The coil 30 may be carried by a pintle 33 mounted to rotate axially in a suitable frame. Motion of the pintle and coil 30 is yieldingly opposed by an upper spiral spring 34 and a lower spiral spring 35. These springs are so arranged that when the movable coil is deflected they are twisted in opposite directions, the top spring tending to wind and the lower spring tending to unwind. The effect is such as to neutralize the effect of variation of the springs from the law of proportional deflection. The tension of the top spring may be adjusted so that it will just oppose a predetermined torque exerted by the movable coil and the balancing torque exerted by the lower coil. A pointer 36 associated with the upper spring coöperates with a dial 37 to indicate the adjustment. It is therefore evident that the scale can be calibrated and the tension of the spring 34 may be so set as to hold the coil 30 in a predetermined position for a certain wattage. For instance, the tension on the spring 34 may be set to balance the torque of the coil 30 when the heater circuit is operating at 1000 watts. The coil 30 will then remain in a predetermined position as long as the energy supplied to the heater is 1000 watts. If this wattage be exceeded, however, the torque exerted by the coil 30 will exceed that exerted by the spring 34 and the coil 30 will shift a corresponding amount. Likewise, if the wattage falls below 1000 watts the torque exerted by the spring will exceed that exerted by the coil and the coil will move a corresponding amount in the opposite direction.

The path of the current through the series coils 31 and 32 is as follows: from the main line through conductor 8, rheostat B, conductor 9, heater $a$, conductor 10, coils 31 and 32, and back to the main line through conductor 11. As above stated, the movable coil is connected in parallel across the heater $a$. The path of the current through the movable coil is therefore from the conductor 10' through spiral spring 35, coil 30, spiral spring 34 and conductor 11'.

The above described movement of the element 30 in accordance with variations in the wattage of the coils is taken advantage of to control the resistance varying mechanism C. This may be accomplished as follows:

The element 30 when actuated in either direction shifts the extremity of a needle 38 horizontally above the surface of a reciprocating member 39. The member 39 has two contact surfaces 40 and 41, the surface 40 being electrically connected with the magnet 26 by means of conductor 42' and the surface 41 being electrically connected with magnet 27 by means of conductor 43'.

Positioned over the needle 38 are a series of contacts, there being six in the present instance numbered 42, 43, 44, 45, 46 and 47. Contacts 42, 43 and 44 lie over the contact surface 40 while contacts 45, 46 and 47 lie over the contact surface 41.

The extreme contacts 42 and 47 are electrically connected by means of a conductor 48 with a finger 49 of a contact drum presently to be described. The next two contacts 43 and 46 are electrically connected by means of conductor 50 with a finger 51 and the two innermost contacts 44 and 45 are electrically connected by means of a conductor 52 with a finger 53.

Current is distributed to these fingers by a contact drum 54 which may be rotated from the crank shaft 18 by means of the gears 55 and 56. The contact drum carries three conducting segments for the three fingers 49, 51 and 53. The segments are shown at 57, 58 and 59 and successively decrease in length. Current is supplied to the contact drum from the generator 6 through a conductor 60 to a finger 61. A segment 62 on the contact drum receives the current from the finger 61 and supplies it to the three segments 57, 58 and 59 with which it is electrically connected. Positioned between the segments 57, 58 and 59 on the one hand and segment 62 on the other is another segment 63 which coöperates with a finger 64. The finger 64 is electrically connected by means of a conductor 65 with one end of a solenoid 66, the other end of the solenoid being connected with the generator 6 through conductor 67. The solenoid 66 acts upon a core 68 associated with the bar 39 so that successive energization and deënergization of the solenoid will reciprocate the bar 39 in a vertical direction. This successive energization and deënergization of the solenoid is effected by the segment 63 during rotation of the contact drum.

In addition to the fingers described above there may be provided an additional finger 69 to which current is supplied by extensions 62' and 62'' on the segment 62 twice during each revolution of the drum 54. The purpose of this finger 69 will be hereinafter described.

The bar 39 normally remains in its lowermost position so that the free movement of the needle 38 between the contacts 42, 43, 44, 45, 46 and 47 and the bar 39 is not interfered with. Once during each revolution of the contact drum 54 the solenoid will be energized to lift the bar 39. It will now be noted that if the needle 38 occupies the position shown on the drawing it will not be forced against any of the contacts when the bar 39 is lifted, but if said needle has first been moved by the coil 30 in one direction or the other it will be clamped either between the conducting surface 40 and one of the contacts 42, 43 and 44, or between conducting surface 41 and one of the contacts 45, 46 and 47, depending upon which direction the needle moves, and the amount of its movement. If the extremity of the needle lies under contact 44 when the bar 39 is lifted a circuit will be completed by the contact drum through magnet 26 and the duration of energization of the magnet will be controlled by the segment 59 and finger 53 as the latter is connected with the contact 44. The path of the current would then be from generator 6, through conductor 60, finger 61, to segment 62, then to segment 59, finger 53, conductor 52, contact 44, needle 38, contact surface 40, conductor 42', magnet 26 and then back to the generator. If the needle lies under contact 43 when the bar 39 is lifted the same magnet will be energized but the energization will be for a longer period as segment 58 controls the period of energization and segment 58 is longer than segment 59. Likewise, if the needle lies under contact 42 when the bar 39 is lifted the period of energization of the magnet 26 will be longer, as segment 57 will then control this period and segment 57 is longer than either segment 58 or 59.

If the needle 38 moves in the opposite direction over contact surface 41 and under the contacts 45, 46 and 47, the magnet 27 will be energized and the period of energization will depend upon which contact the needle lies under when the bar 39 is lifted. For instance, if the needle completes a circuit between the contact surface 41 and the contact 45, current will pass from the generator through conductor 60, finger 61, segment 62, segment 59, finger 53, conductor 52, contact 45, needle 38, contact surface 41, conductor 43', magnet 27 and then back to the generator. If the needle lies under contact 46 segment 53 will control the period of energization of the magnet 27 and if the needle lies under contact 47 segment 57 will control the period of energization.

When the segment 57 controls the period of energization of either magnet 26 or 27 the magnet is energized long enough to cause the corresponding pawl to move the ratchet wheel 25 a distance of three teeth. When segment 58 controls this period the energized magnet will move the ratchet wheel a distance of two teeth and when the segment 59 controls the period of energization the energized magnet will move the ratchet wheel a distance of only one tooth. This movement of the ratchet wheel is transmitted to the arm 12 which varies the resistance of the rheostat B a corresponding amount. The direction of rotation of the ratchet to cut in or out resistance depends, of course, on which of the magnets 26 or 27 is energized.

It will now be seen that if the coil 30 of the torsional wattmeter is deflected in one direction the resistance of the heater circuit will be increased by the rheostat B an amount corresponding with the amount of movement of the coil and if said coil is deflected in the opposite direction, resistance will be cut out of the heater circuit by the rheostat B an amount corresponding with the amount of movement of the coil 30. It is, therefore, evident that when the tension of spring 34 is set to oppose a predetermined wattage at which the heater is supposed to operate, any variations in that wattage caused in any manner, such as change in resistance of the heater, or change in the voltage of the main line, will deflect the coil 30 to insert or remove resistance from the heater circuit to maintain the wattage of the heater constant.

A graphic wattmeter W may be properly connected with the heater and the torsional wattmeter to indicate the wattage through the heater. After the controlling torsional wattmeter has been properly regulated there may be but little need for the graphic wattmeter, but it may be of value in checking the operation of the torsional wattmeter to ascertain if the heater is operating at a constant wattage as intended.

The graphic wattmeter W may be of the type in which the recording needle is electromagnetically operated to bring it into contact with the chart intermittently. The line on the chart will then be in reality a succession of dots. The energization of the magnetic means in the wattmeter for so actuating the needle may be controlled by the extensions 62' and 62'' on the segment 62, which coöperate with the finger 69. These extensions serve to make and break a circuit through said magnetic means twice during each revolution of the commutator 54.

It will now be seen that the wattage of the heater may be maintained constant independent of other conditions, such as changes in the heater resistance and changes in the voltage of the main line, for the torsional wattmeter is responsive to any changes in wattage of the heater circuit and these changes are compensated for by the automatic actuation of the rheostat B. Variations in the resistance of the thermometer resistances b and c will not affect the wattage of the heater for the thermometer resistances are supplied from a separate and independent source of current, to wit, the generator 6.

I do not wish to limit myself to the use of the instrumentalities shown and described for producing the results set forth for these results might be obtained in other ways. The apparatus shown is merely exemplary and numerous changes may be made therein without departing from the scope of the invention as defined in the accompanying claims.

What I claim is:—

1. A meter for measuring the flow of fluids, comprising an electric heater, means for automatically causing said heater to operate at a constant wattage independent of the variations in voltage of the main line or variations in resistance of the heater, and means whereby the effect of the heat transfer between the heater and fluid may be utilized in determining the rate of flow of the fluid.

2. A meter for measuring the flow of fluids, comprising a heater connected in an electric circuit, means controlled by the wattage of the heater circuit for maintaining the heater wattage constant, and means whereby the effect of the heat transfer between the heater and fluid may be utilized in determining the rate of flow of the fluid.

3. A meter for measuring the flow of fluids, comprising a heater connected in an electric circuit, means for varying the supply of electric energy to the heater, means controlled by the wattage of the heater circuit for operating said last named means, and means whereby the effect of the heat transfer between the heater and fluid may be utilized in determining the rate of flow of the fluid.

4. A meter for measuring the flow of fluids, comprising a heater connected in an electric circuit, a resistance electrically connected with said heater to control the wattage thereof, automatic means controlled by the wattage of the heater circuit for regulating said heater resistance, and means whereby the effect of the heat transfer between the heater and fluid may be utilized in determining the rate of flow of the fluid.

5. A meter for measuring the flow of fluids, comprising a heater connected in an electric circuit, a movable element whose position is controlled by the wattage of the heater circuit, means whereby the position of said element determines the wattage of the heater, and means whereby the effect of the heat transfer between the heater and fluid may be utilized in determining the rate of flow of the fluid.

6. A meter for measuring the flow of fluids, comprising a heater connected in an electric circuit, a movable element whose position is controlled by the wattage of the heater circuit, a variable resistance electrically connected with the heater, means whereby said resistance is varied in accordance with the changes in the position of said element, and means whereby the effect of the heat transfer between the heater and fluid may be utilized in determining the rate of flow of the fluid.

7. A meter for measuring the flow of fluids, comprising a heater connected in an electric circuit, a movable element whose position is controlled by the wattage of the heater circuit, a variable resistance electrically connected with the heater, means for positively varying said resistance, a plurality of electric circuits controlled by the position of said element for actuating said last named means, and means whereby the effect of the heat transfer between the heater and fluid may be utilized in determining the rate of flow of the fluid.

8. A meter for measuring the flow of fluids, comprising a heater connected in an electric circuit, means for regulating the wattage of said heater, means controlled by the wattage of the heater circuit for controlling said first named means, and means whereby the effect of the heat transfer between the heater and fluid may be utilized in determining the rate of flow of the fluid.

9. A meter for measuring the flow of fluids, comprising a heater connected in an electric circuit, a variable resistance electrically connected with said heater, means controlled by the wattage of the heater circuit for varying said resistance, and means whereby the effect of the heat transfer between the heater and fluid may be utilized in determining the rate of flow of the fluid.

10. A meter for measuring the flow of fluids, comprising a heater connected in an electric circuit, a movable element the position of which is controlled by the wattage of the heater circuit, a variable resistance electrically connected with said heater, automatic means to vary said resistance comprising a plurality of electric circuits controlled by said movable element, and means whereby the effect of the heat transfer between the heater and fluid may be utilized in determining the rate of flow of the fluid.

11. A meter for measuring the flow of fluids, comprising a heater connected in an electric circuit, a movable wattmeter element, means whereby changes in the position of said element vary the wattage of the heater, and means whereby the effect of the heat transfer between the heater and fluid may be utilized in determining the rate of flow of the fluid.

12. A meter for measuring the flow of fluids, comprising a heater connected in an electric circuit, a variable resistance electrically connected with said heater, means for positively varying said resistance, electric means for controlling said last named means, a movable element controlled by the wattage of the heater circuit for controlling said electric means, and means whereby the effect of the heat transfer between the heater and fluid may be utilized in determining the rate of flow of the fluid.

13. The method of measuring the rate of flow of a fluid which consists in imparting heat to the fluid by means of an electrical heater, maintaining said heater at a constant wattage independent of the resistance of the heater and independent of the line voltage by varying the resistance of the circuit in which the heater is connected in accordance with departures in the wattage of the heater from a predetermined value, and utilizing the effect of the heat transfer between the heater and the fluid in determining the rate of flow of the fluid.

In witness whereof, I have hereunto subscribed my name.

J. C. WILSON.